(12) United States Patent
Johnson

(10) Patent No.: US 12,038,101 B1
(45) Date of Patent: Jul. 16, 2024

(54) WATER VALVE UTILIZING PUSH-PULL HANDLE TO CONTROL WATER FLOW THERETHROUGH

(71) Applicant: Ernest R. Johnson, Somerdale, NJ (US)

(72) Inventor: Ernest R. Johnson, Somerdale, NJ (US)

( * ) Notice: Subject to any disclaimer, the term of this patent is extended or adjusted under 35 U.S.C. 154(b) by 0 days.

(21) Appl. No.: 18/407,087

(22) Filed: Jan. 8, 2024

Related U.S. Application Data

(60) Provisional application No. 63/628,030, filed on Jun. 15, 2023.

(51) Int. Cl.
| | |
|---|---|
| *F16K 31/60* | (2006.01) |
| *F16K 3/314* | (2006.01) |
| *F16K 27/04* | (2006.01) |
| *F16K 27/12* | (2006.01) |
| *F16K 31/56* | (2006.01) |
| *F16K 41/06* | (2006.01) |

(52) U.S. Cl.
CPC ............ *F16K 31/607* (2013.01); *F16K 3/314* (2013.01); *F16K 27/041* (2013.01); *F16K 27/12* (2013.01); *F16K 31/56* (2013.01); *F16K 41/06* (2013.01)

(58) Field of Classification Search
CPC ........ F16K 31/607; F16K 31/56; F16K 3/314; F16K 27/041; F16K 27/12; F16K 41/06
See application file for complete search history.

(56) References Cited

U.S. PATENT DOCUMENTS

| | | | | | |
|---|---|---|---|---|---|
| 1,713,905 | A | * | 5/1929 | Kadlec ................. | F16K 3/0209 251/266 |
| 2,204,452 | A | * | 6/1940 | Seppelfricke ............ | F16K 3/28 251/327 |
| 2,213,680 | A | * | 9/1940 | Share ....................... | F16K 1/34 251/319 |
| 2,535,953 | A | * | 12/1950 | Powers, V ................ | F16K 3/22 251/327 |
| 2,797,062 | A | * | 6/1957 | Otter ........................ | F16K 3/28 251/168 |
| 2,913,012 | A | * | 11/1959 | McCurley ............ | F16L 55/105 251/191 |

\* cited by examiner

*Primary Examiner* — Eric Keasel
(74) *Attorney, Agent, or Firm* — Douglas J. Ryder; Ryder, Mazzeo & Konieczny LLC

(57) ABSTRACT

A water valve that does not include a stem or handwheel that can calcify and become hard to operate. The valve includes a stopper within a body running perpendicular to the flow of water that can be pushed inward to stop the flow of water or pulled outward to allow the flow of water. The stopper is connected to a handle that a user can push or pull depending on the action to be taken. The use of the stopper and handle in a push/pull arrangement provides an easy manner of operation as it does not require any turning of a handwheel or the like.

20 Claims, 13 Drawing Sheets

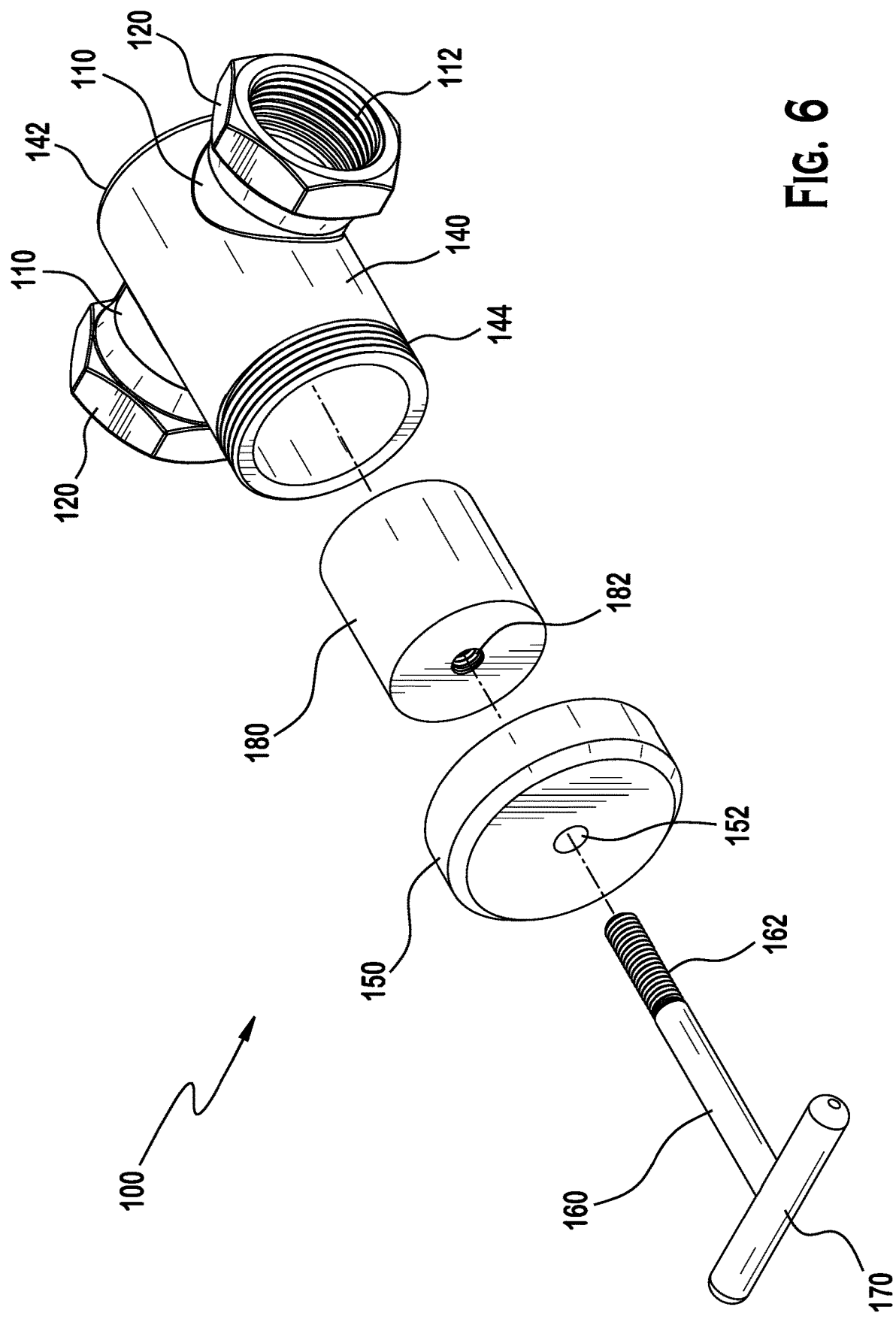

WATER VALVE UTILIZING PUSH-PULL HANDLE TO CONTROL WATER FLOW THERETHROUGH

BACKGROUND

Water values are used to permit or block the flow of water therethrough. Gate valves typically include a handwheel, a stem and a blocking element (gate). The handwheel is for a user to turn in order to operate (open/close) the valve. The stem is connected to the handwheel and the gate. When a user turns the handwheel it rotates the stem which causes the gate to move up or down depending on the direction of rotation. To close the valve the handwheel is turned clockwise so as to lower the gate into the path of the water to block the flow thereof. To open the valve the handwheel is turned counterclockwise to raise the gate out of the path of the water to enable the flow therethrough. The stem may be permanently affixed to the gate so that the stem extends further out when the valve is open. Alternatively, the gate may be threadedly connected to the stem so that the gate moves up and down on the stem as the stem rotates but remains in place as the handwheel is turned.

Water often has minerals contained therein. One of those minerals is calcium. As water flows through a metal water valve, the calcium salts contained therein may separate and cling to the metal water valve, including the stem and handwheel. The calcification of the stem and the handwheel may make it difficult to operate the gate valve. That is, it may be difficult to turn the handwheel to either open or close the valve. A valve that is difficult to open or close may make valve unusable for individuals lacking the strength or tools required to turn the handwheel.

What is needed is a valve that is less susceptible to calcification and easier for a user to engage if they have limited strength and/or do not have tools to assist in operating the valve.

BRIEF DESCRIPTION OF THE DRAWINGS

The features and advantages of the various embodiments will become apparent from the following detailed description in which:

FIG. 6 illustrates an exploded view of the example valve of FIG. 1, according to one embodiment.

DETAILED DESCRIPTION

Figure 1:
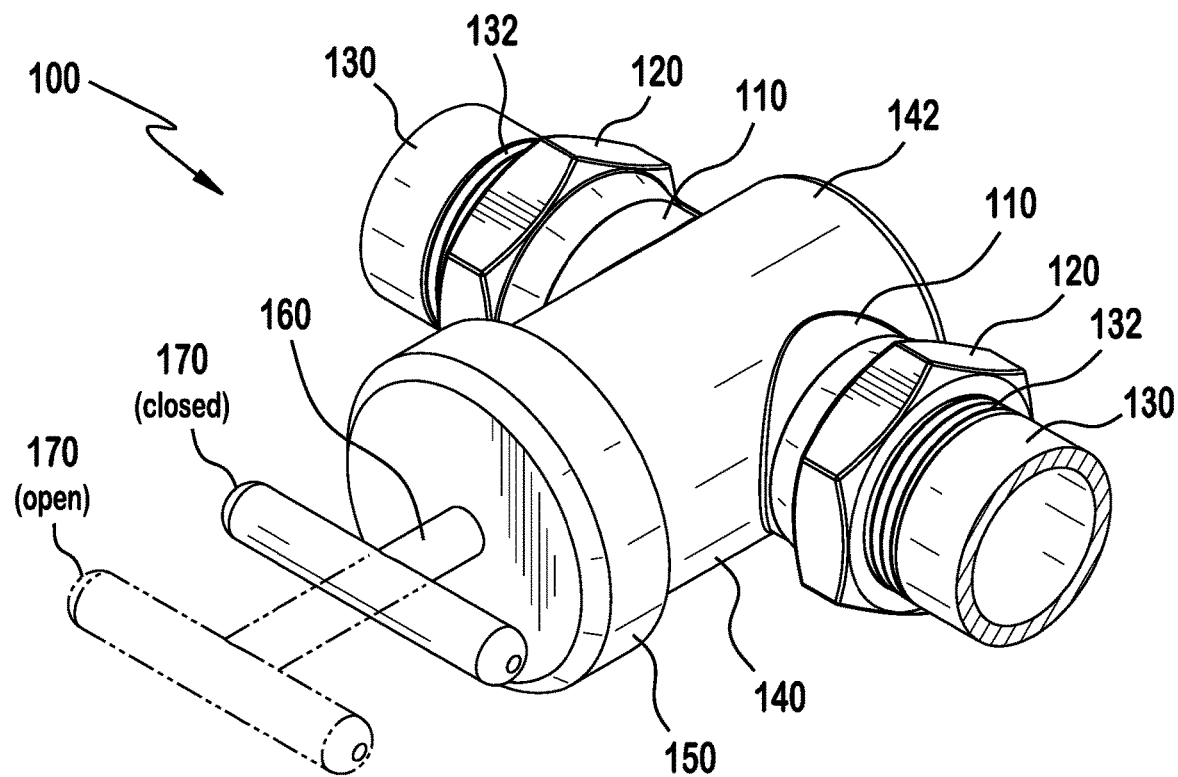
FIG. 1 illustrates a perspective view of an example valve, according to one embodiment.

A valve is proposed that does not include a stem or handle that can calcify and become hard to operate. The valve includes a stopper within a body running perpendicular to the flow of water that can be pushed inward to stop the flow of water or pulled outward to allow the flow of water. The stopper is connected to a handle that a user can push or pull depending on the action to be taken. The use of the stopper and handle in a push/pull arrangement provides an easy manner of operation as it does not require any turning of a handwheel or the like. Furthermore, this configuration limits the impact that calcification could have on the operation thereof.

FIGS. 1-6 illustrate various views of an example push-pull water valve 100 according to one embodiment. The valve 100 may be made from metals including, but not limited to, brass, cast iron, galvanized pipe, bronze, stainless steel, alloy steels, and gunmetal. As with other valves, the valve 100 is used to receive water pipes and control the flow of water therethrough. The valve 100 includes a passthrough pipe 110 to receive a water pipe 130 on each side (an inlet and an outlet) thereof and provide a pathway therebetween. As illustrated, an inner diameter of the ends of the passthrough pipe 110 and an outer diameter of the ends of the water pipe 130 may be threaded 112, 132 to provide connectivity therebetween. The outer diameter of the ends of the passthrough pipe 110 may be shaped 120 (e.g., hex shaped) so as to enable a wrench to be used to assist in screwing the water pipe 130 thereinto.

However, the pipes 110, 130 are not limited to being threaded and any type of connectivity between the valve 100 and the water pipes 130 is within the current scope. For example, the water pipes 130 could be soldered (sweated) to the passthrough pipe 110. Alternatively, the connections could be, but are not limited to, push to connect fittings, compression fittings, and/or Pro-press fittings.

Extending perpendicular to the passthrough pipe 110 is a shut-off shaft 140. The shaft 140 has a wider diameter than the passthrough pipe 110 and extends past the passthrough pipe 110 in both directions (e.g., above and below). In effect, the passthrough pipe 110 passes through the shaft 140. A first end (e.g., top) 142 of the shaft 140 extends slightly past the passthrough pipe 110 and is sealed. A second end (e.g., bottom) of the shaft 140 extends more than the diameter of the passthrough pipe 110 past the passthrough pipe 110 (to be described in more detail later). The second end is open and receives a cover 150 to close the opening therein. As illustrated, an inner diameter of the cover 150 and an outer diameter of a lower edge of the shaft 140 are threaded 144, 152 to provide connectivity therebetween. The connection thereto is not limited to threads as other means of connectivity are within the current scope. The cover 150 could be removably connected to the shaft 140 or could be affixed in a more permanent manner (e.g., sweated on).

Located within the shaft 140 is a stopper 180 that is used to block the flow of water through the passthrough pipe 110 when in a closed configuration. The stopper 180 has a diameter substantially the same as the diameter of the shaft 140 to provide a tight seal with the shaft 140. The stopper 180 has a length greater than the diameter of the passthrough pipe 110 so as to seal off the passthrough pipe 110 in the closed configuration. The stopper 180 may be made of rubber or other compressible material. Alternatively, the stopper 180 may be made of a more rigid material (e.g., metal) that includes one or more rubber (or other compressible) washers, O-rings or the like that provide for sealing.

When in a closed configuration, a first end (e.g., top) of the stopper 180 will extend past a first side (e.g., top) of the pipe 110 and abut the closed end 142 of the shaft 140 and a second end will extend past the inner diameter of a second side (lower) of the pipe 110. The first end of the shaft 140 extends past the first side of the pipe 110 enough to provide a surface for the stopper 180 to abut against (could not abut curved pipe 110). When in an open configuration, the first end of the stopper 180 needs to be below an inner diameter of the second side of the pipe 110 so as to not interfere with the flow of water through the pipe 110. Accordingly, the second end of the shaft 140 has to extend far enough below the pipe 110 to allow the stopper 180 to be housed therewithin and not restrict water flow. That is, the shaft 140 has to extend at least the length of the stopper 180 below the pipe 110, and the length of the stopper 140 is greater than the diameter of the pipe 110.

The stopper 180 is connected to a stem 160. As illustrated, the stopper 180 has a threaded hole 182 formed therein and a first end (e.g., top) of the stem 160 is threaded 162 and the two are threadedly attached. However, the stem 160 may be secured to the stopper 180 in various manners without departing from the current scope. For example, the first end of the stem 160 could pass through the stopper 180 and be secured above, and possibly below, the stopper 180 with nuts, rings, clips, clamps, or the like. Alternatively, the first end of the stem 160 could be glued within an opening in the stopper 180 or the stopper 180 could be formed around the stem 160.

A second end (e.g., bottom) of the stem 160 passes through a hole 152 in the cover 150 and has a handle 170 connected thereto. The handle 170 is substantially perpendicular to the stem 160 and is located outside the shaft 140. The handle 170 provides a user a means to push or pull the stem 160 and the stopper 180 inward to block the flow of water or outward to allow water to flow. When the valve 100 is in a closed configuration, the handle 170 may be in close proximity to the cover 150. When the valve 100 is in an open configuration, the handle 170 will extend at least the length of the stopper 180 further away from the cover 150.

FIG. 1 illustrates a perspective view of the example valve 100. Water pipes 130 having external threads 132 at ends thereof are shown threaded into each side (inlet and outlet) of the passthrough pipe 110. The pipe 110 passes through an upper portion of the shaft 140 so that the first end of the shaft 140 extends slightly above the pipe 110 and the second end extends at least the length of the stopper (not visible) below the pipe 110. The cover 150 is secured to the second end of the shaft 140. A portion of the stem 160 and the handle 170 are located external to the shaft 140 and pass through the hole 152 in the cover 150. The valve 100 is shown in a closed configuration where the handle 170 is in close proximity to the cover 150 and in an open configuration (indicated by dotted lines) where the handle 170 is located further away (an additional distance of the stopper) from the cover 150.

Figure 2:
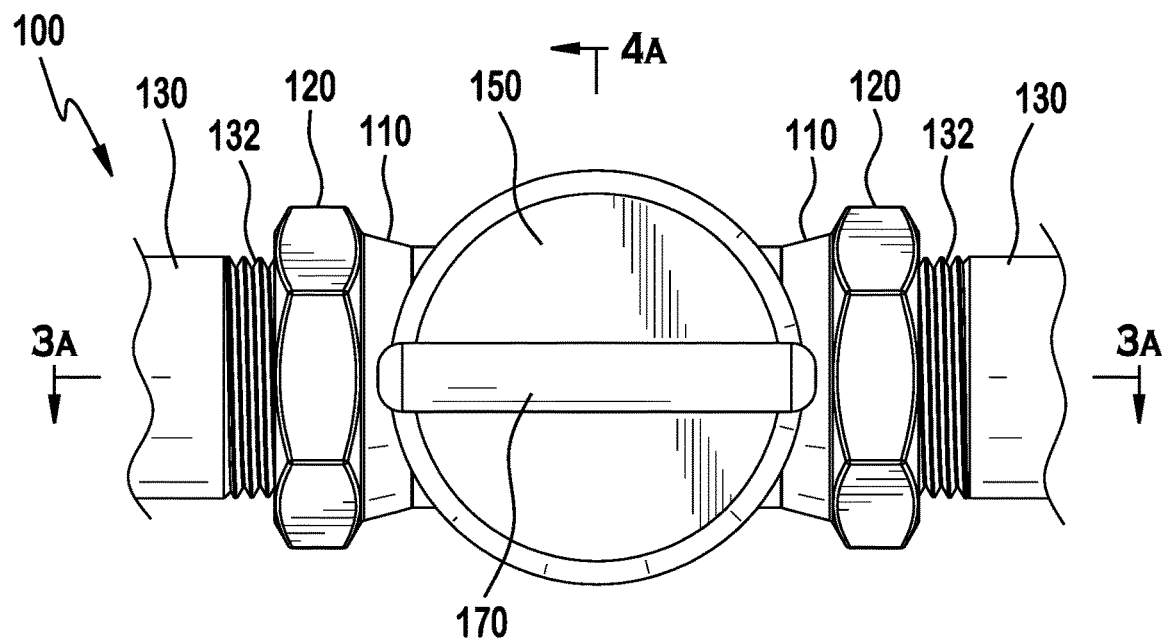
FIG. 2 illustrates a bottom view of the example valve of FIG. 1, according to one embodiment.

FIG. 2 illustrates a bottom view of the example valve 100. The threaded ends 132 of the water pipes 110 are screwed into each side of the passthrough pipe 110. The cover 150 is secured to the second end of the shaft (not visible in this view). The handle 170 is shown to extend across the cover 150.

Figure 3A:
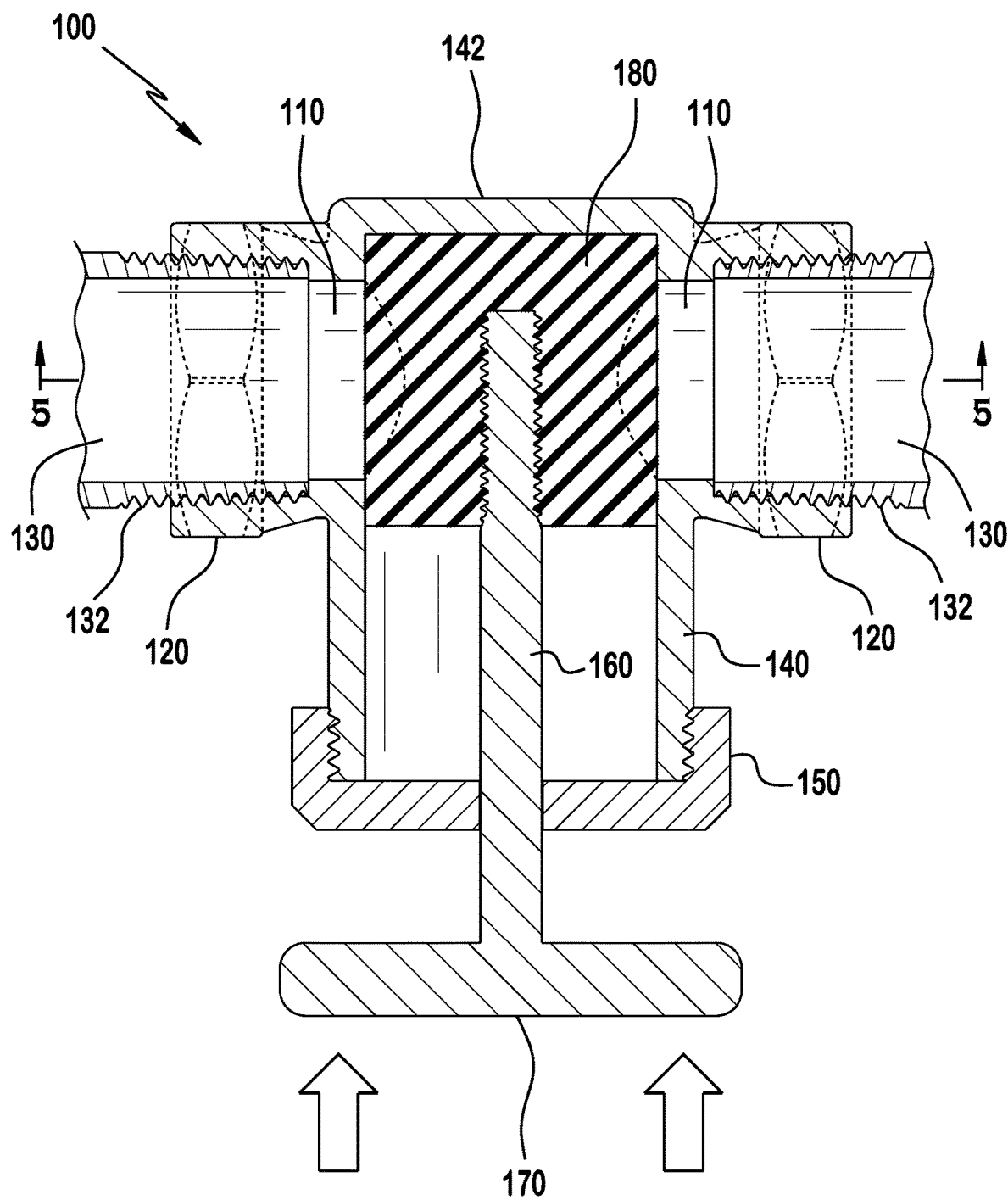
FIG. 3A illustrates a side-to-side cross-sectional view (section 3A of FIG. 2) of the example valve of FIG. 1 in a closed configuration, according to one embodiment.

FIG. 3A illustrates a side-to-side cross-sectional view (section 3A of FIG. 2) of the example valve 100 in a closed configuration. The handle 170 was pushed inward so that the stopper 180 is pushed into the shaft 140 so that the first end of the stopper 180 abuts the first end 142 of the shaft 140 that extends past the first side of the pipe 110. The stopper 180 clearly blocks the passthrough pipe 110 (each side of the pipe 110 entering the shaft 140 is blocked by the stopper 180). The stopper 180 extends slightly below the second end of the pipe 110 to ensure a complete seal. Accordingly, the water is prevented from flowing from inlet to outlet of the pipe 110. The first end of the stem 160 is illustrated as being threaded to the stopper 180. The water pipes 130 are illustrated as being threaded into the passthrough pipe 110. The cover 150 is illustrated as being threaded onto the second end of the shaft 140. The hex shaped nut 120 located externally at the ends of the pipe 110 are illustrated in dotted lines to provide context to where they are located even though they would not be visible in this cross-sectional view.

Figure 3B:
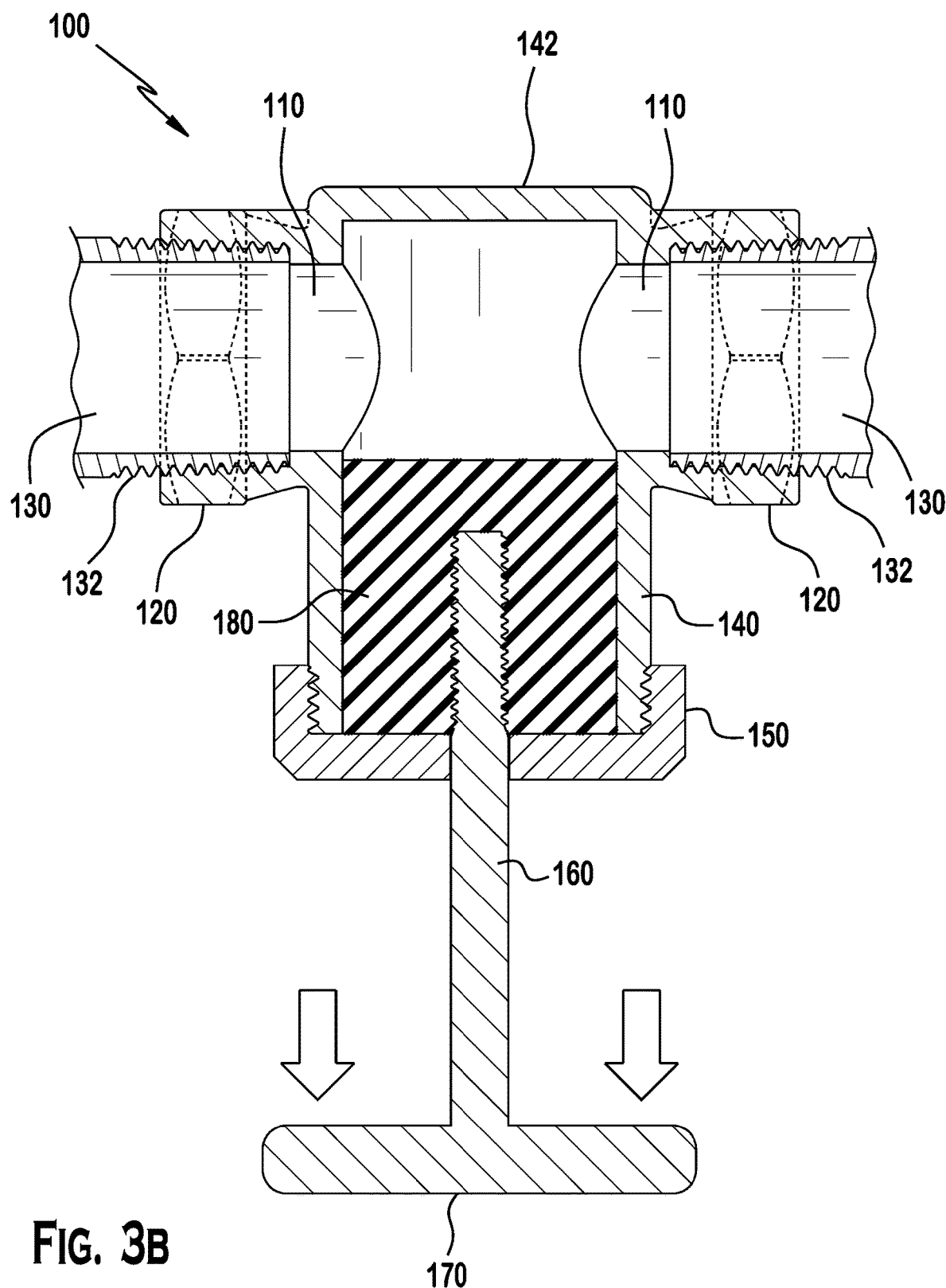
FIG. 3B illustrates a side-to-side cross-sectional view (section 3A of FIG. 2) of the example valve of FIG. 1 in an open configuration, according to one embodiment.

FIG. 3B illustrates a side-to-side cross-sectional view (section 3A of FIG. 2) of the example valve 100 in an open configuration. The handle 170 was pulled outward so that the stopper 180 has been pulled back in the shaft 140 so as to not be located within (block) the pipe 110 traversing through the upper portion of the shaft 140. The water is free to flow from inlet to outlet of the pipe 110.

Figure 4A:
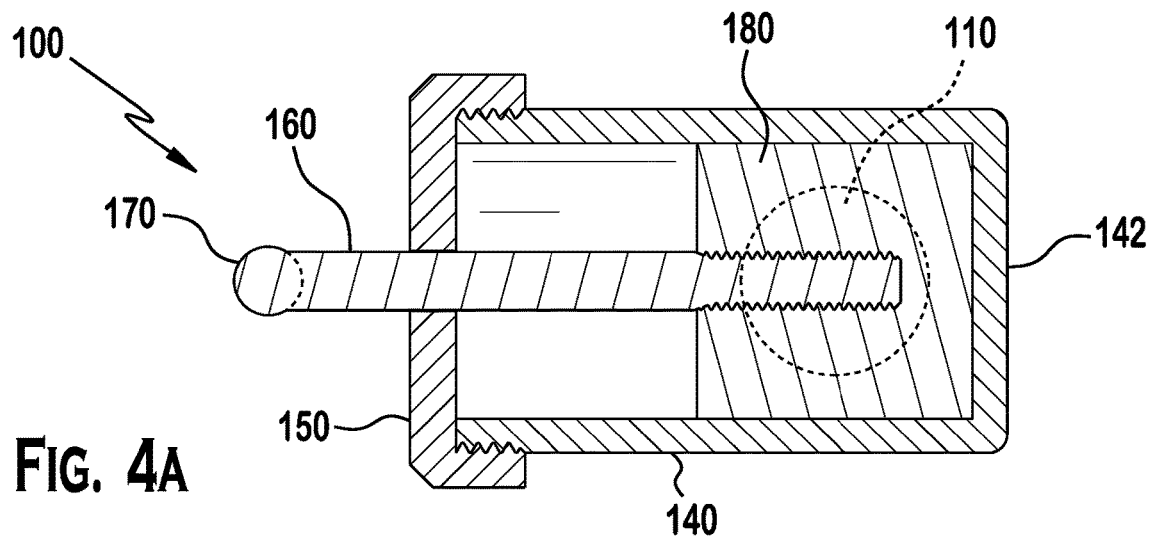
FIG. 4A illustrates a front-to-back cross-sectional view (section 4A of FIG. 2) of the example valve of FIG. 1 in a closed configuration, according to one embodiment.
Figure 4B:
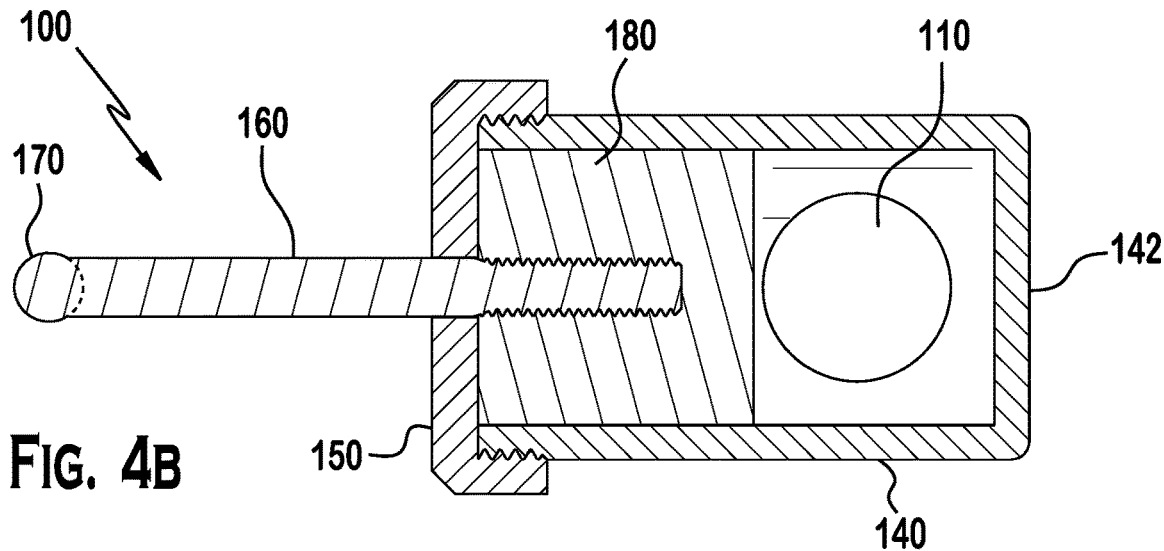
FIG. 4B illustrates a front-to-back cross-sectional view (section 4A of FIG. 2) of the example valve of FIG. 1 in an open configuration, according to one embodiment.

FIG. 4A illustrates a front-to-back cross-sectional view (section 4A of FIG. 2) of the example valve 100 in a closed configuration. The handle 170 was pushed inward so that the stopper 180 is pushed into the shaft 140 and completely blocks the pipe 110 passing therethrough. The first end of the stopper 180 extends past the first side of the pipe 110 (abuts the first end 142 of the shaft 140) and the second end extends past the second side of the pipe 110. FIG. 4B illustrates a front-to-back cross-sectional view (section 4A of FIG. 2) of the example valve 100 in an open configuration. The handle 170 was pulled outward so that the stopper 180 is pulled back in the shaft 140 so as to not interfere with the pipe 110 passing therethrough. The first end of the stopper 180 is below the second side of the pipe 110 and the second end may be located close to (and possibly abut) the cover 150.

Figure 5:
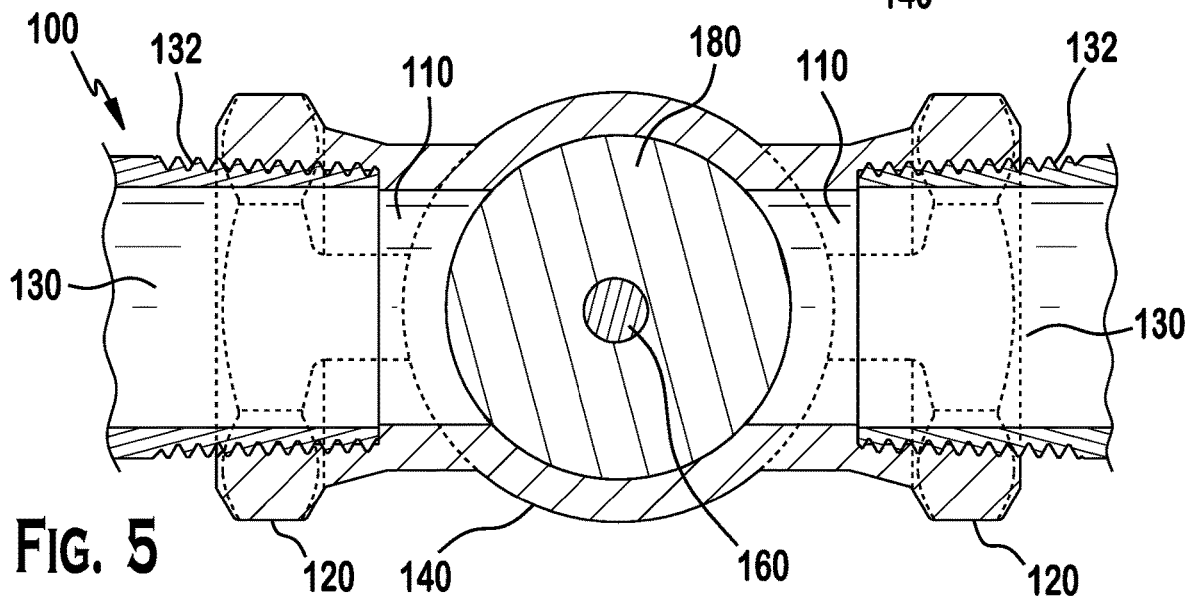
FIG. 5 illustrates a top-to-bottom cross-sectional view (section 5 of FIG. 4A) of the example valve of FIG. 1 in a closed configuration, according to one embodiment.

FIG. 5 illustrates a top-to-bottom cross-sectional view (section 5 of FIG. 4A) of the example valve 100 in a closed configuration. The stopper 180 is located in the shaft 140 completely blocking the pipe 110 passing therethrough. The stem 160 is illustrated within the stopper 180. The hex shaped nut 120 located externally at the ends of the pipe 110 are illustrated in dotted lines to provide context to where they are located even though they would not be visible in this cross-sectional view.

FIG. 6 illustrates an exploded view of the example valve 100. The shaft 140 has a larger diameter than the pipe 110. The pipe 110 passes through an upper portion of the shaft 140 and includes shaped (hexagon) outer ends 120 and threaded internal ends 112. The first end 142 of the shaft 140 extends slightly past the first side of the pipe 110 and is closed. The second end of the shaft 140 extends substantially below (at least length of the stopper 180) the second side of the pipe 110 and is open and includes a threaded outer end 144. The stopper 180 will be located within the shaft 140 before the shaft 140 is closed with the cover 150. The stopper 180 has a diameter substantially the same as the diameter of the shaft 140 and a length greater than the diameter of the pipe 110 as described above. The stopper 180 is illustrated as including a threaded hole 182 for connecting to the stem 160.

The cover 150 includes a centrally located hole 152 to enable the stem 160 to pass therethrough. The cover 150 includes a threaded internal diameter (not visible) for threadedly engaging the shaft 140. The stem 160 is illustrated as including a threaded end 162 for securing to the stopper 180. The threaded end 162 passed through the hole 152 and is received with the threaded hole 182. The other end of the stem 160 includes the handle 170. While not illustrated, washers, O-rings, seals or the like may be included within the hole 152 and within the interior of the cover 150 to provide a tight seal.

Figure 7A:
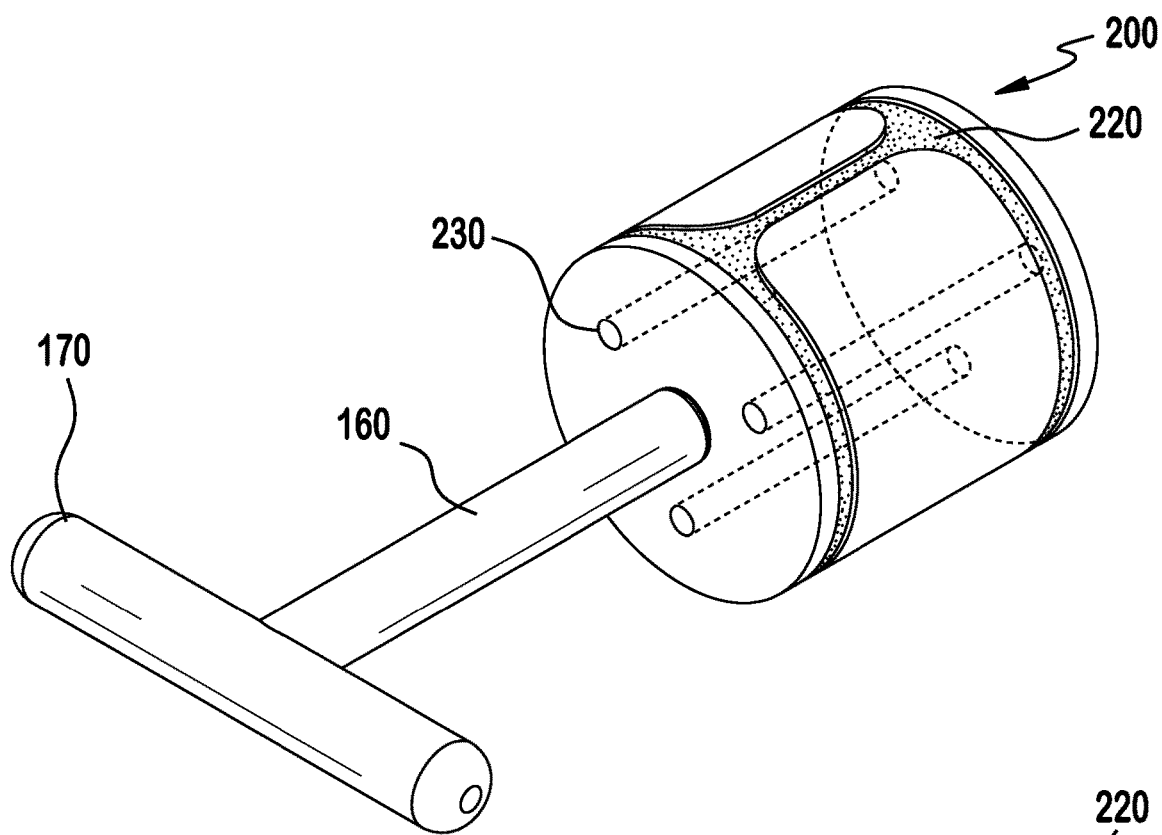
FIGS. 7A-B illustrate an alternative embodiment of a stopper, according to one embodiment.
Figure 7B:
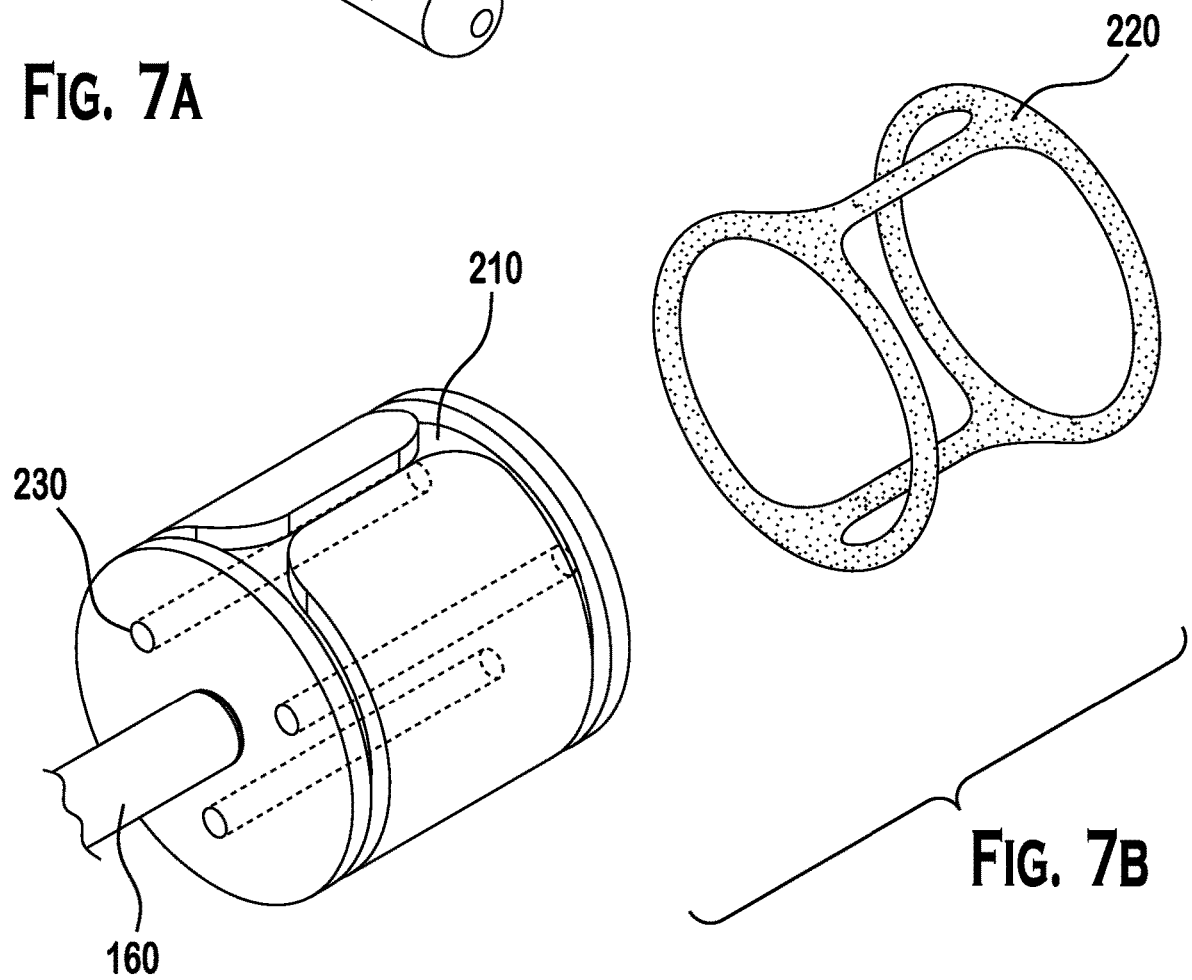

FIGS. 7A-B illustrate an alternative embodiment of a stopper 200. The stopper 200 may be made of a rigid material and may include recesses 210 formed therein for receiving a compressible material (e.g., washer, O-ring, seal) 220 that will provide the necessary seal within the shaft 140. Such an arrangement may enable easier sliding within the shaft as the only portions contacting the shaft may be the compressible material 220. It should be noted that the recesses 210 and the compressible material 220 are illustrated as including upper and lower circular portions to go around the exterior of the stopper 200 and two sides connecting the two circular portions. The recesses 210 and the compressible material 220 are not limited thereto. Rather, any configuration of recesses 210 and compressible material 220 that provide the necessary seal could be utilized without departing from the current scope. For example, simply an upper and lower recess and corresponding compressible material may be used, a different number of sides between the circular portions could be used, or a different number of circular portions could be used. Furthermore, it is possible that the stopper 200 does not include the recesses 210 and simply includes the compressible material 220 around the exterior thereof.

According to one embodiment, the stopper 200 may optionally include one or more channels 230 extending therethrough (3 are illustrated). The purpose of the channels 230 is to enable water that may be flowing through the valve when the valve is being closed to pass therethrough to relieve the pressure and make it easier to close. It should be noted that the channels 230 could optionally be included in stoppers made of a compressible material such as the stopper 180 depicted in FIGS. 1-6.

Figure 8:
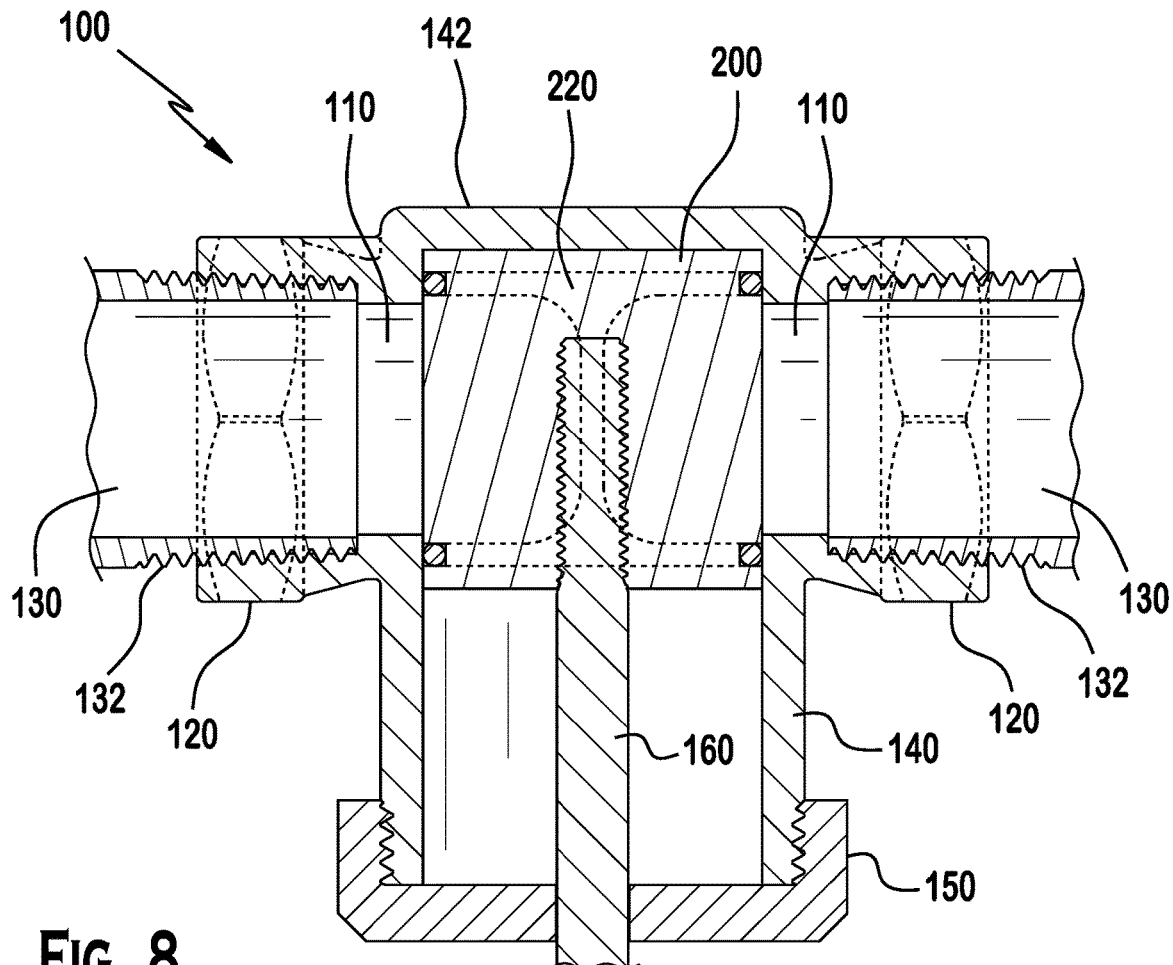
FIG. 8 illustrates a side-to-side cross-sectional view of the example valve of FIG. 1 utilizing the stopper of FIGS. 7A-B, according to one embodiment.
Figure 9:
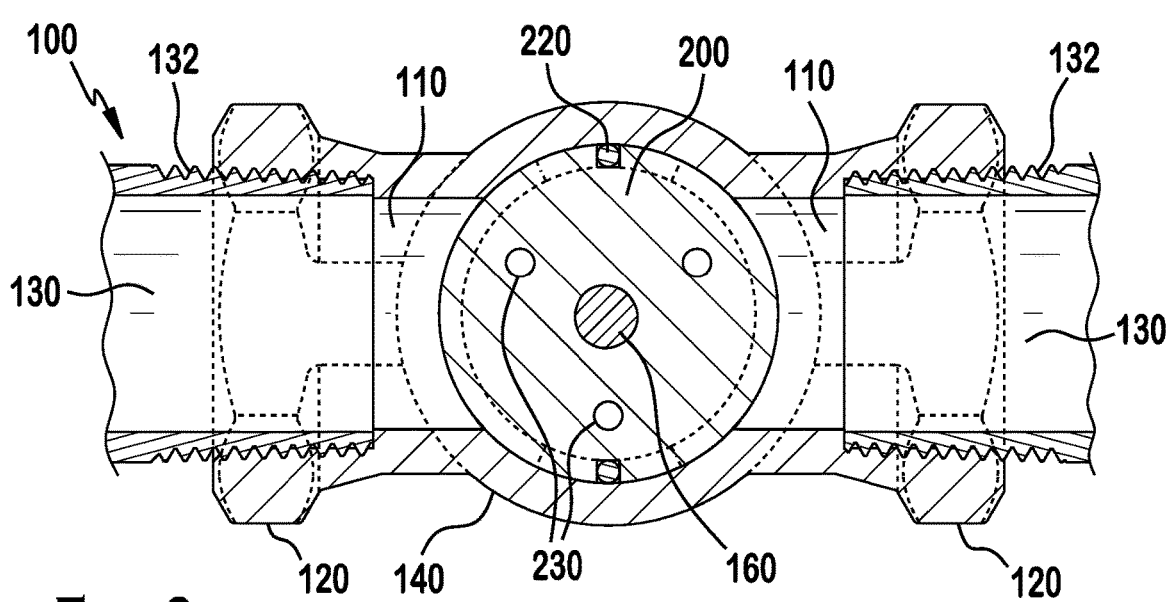
FIG. 9 illustrates a top-to-bottom cross-sectional view of the example valve of FIG. 1 utilizing the stopper of FIGS. 7A-B, according to one embodiment.

FIG. 8 illustrates a side-to-side cross-sectional view (similar to FIGS. 3A-B) of the example valve 100 utilizing the stopper 200. The compressible material 220 provided within the stopper is located above and below the pipe 110 to provide the seal. FIG. 9 illustrates a top-to-bottom cross-sectional view (similar to FIG. 5) of the example valve 100 utilizing the stopper 200. The compressible material 220 is located around an exterior of the stopper 200. The channels 230 through the stopper 200 are located within the body thereof.

Figure 10:
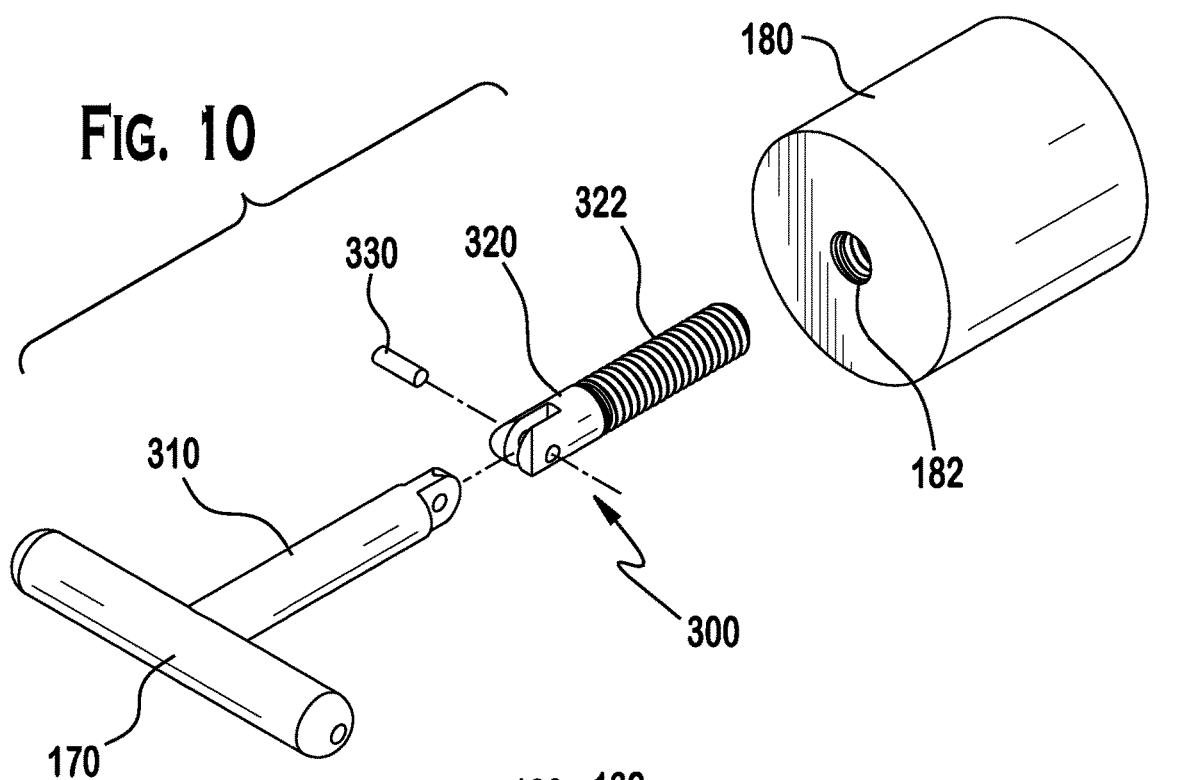
FIG. 10 illustrates an alternative embodiment for a stem, according to one embodiment.
Figure 11:
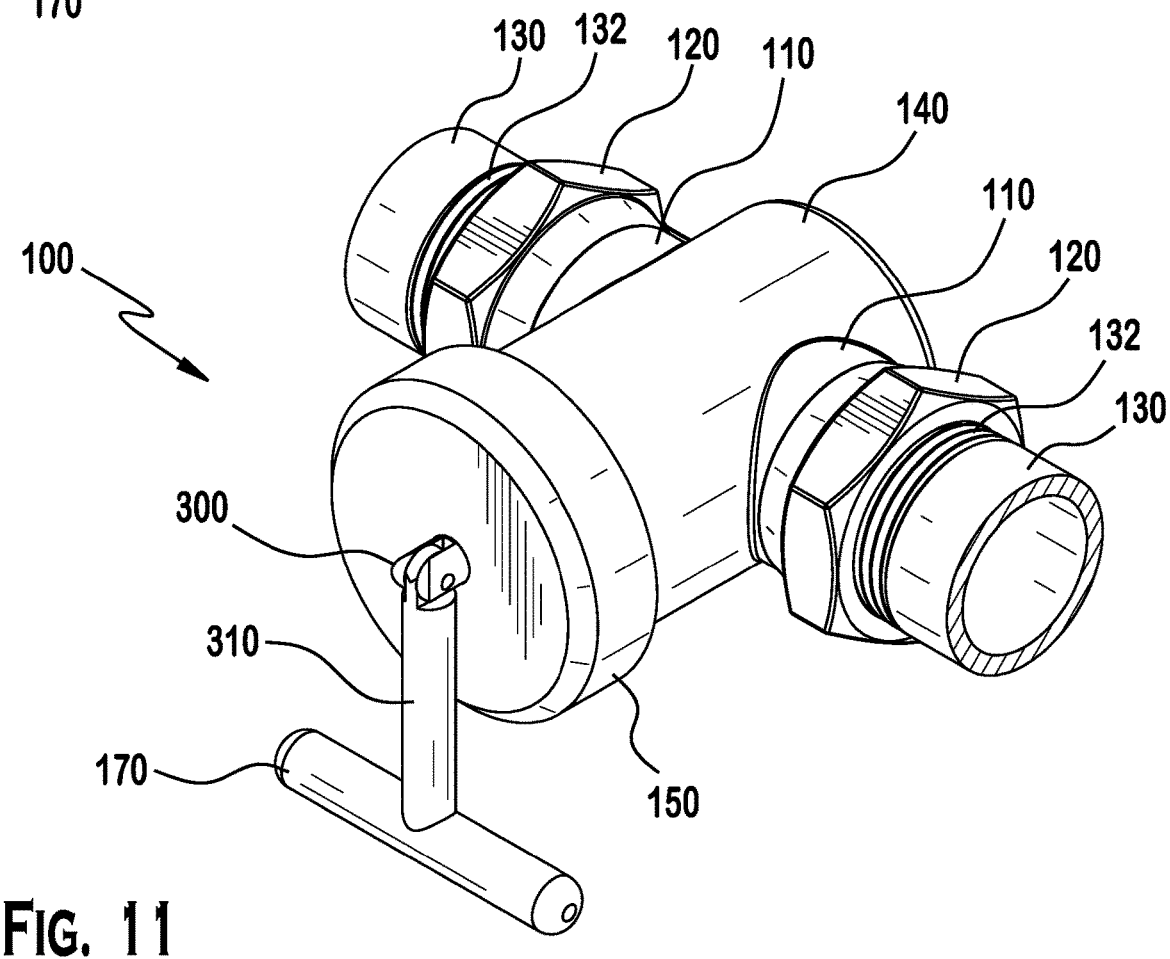
FIG. 11 illustrates the example valve of FIG. 1 utilizing the example stem of FIG. 10, according to one embodiment.

FIG. 10 illustrates an alternative embodiment for a stem 300. The stem 300 is foldable so that when the valve is in an open configuration it can be folded over so that it does not stick out too far from the valve. The stem 300 includes a first part 310 and a second part 320 that are secured together at a pivot point. As illustrated, the pivot point is provided by a pin 330 but is not limited thereto. The first part 310 is connected to the handle 170 and the second part may include a threaded end 322 to be received by a threaded hole 182 in the stopper 180. FIG. 11 illustrates the example valve 100 utilizing the example stem 300 where the first part 310 of the stem 300 and the handle 170 are pivoted downward in the open configuration.

Figure 12A:
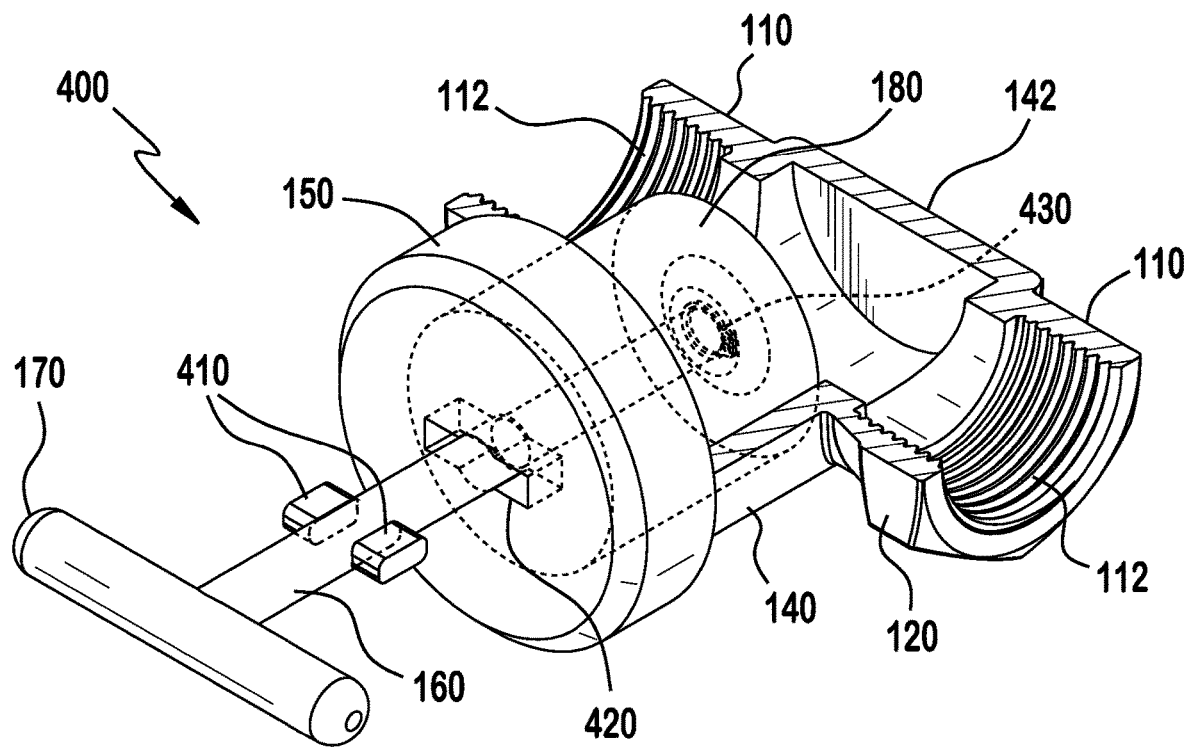
FIGS. 12A-C illustrate perspective views of an example valve capable of being locked in a closed configuration, according to one embodiment.
Figure 12B:
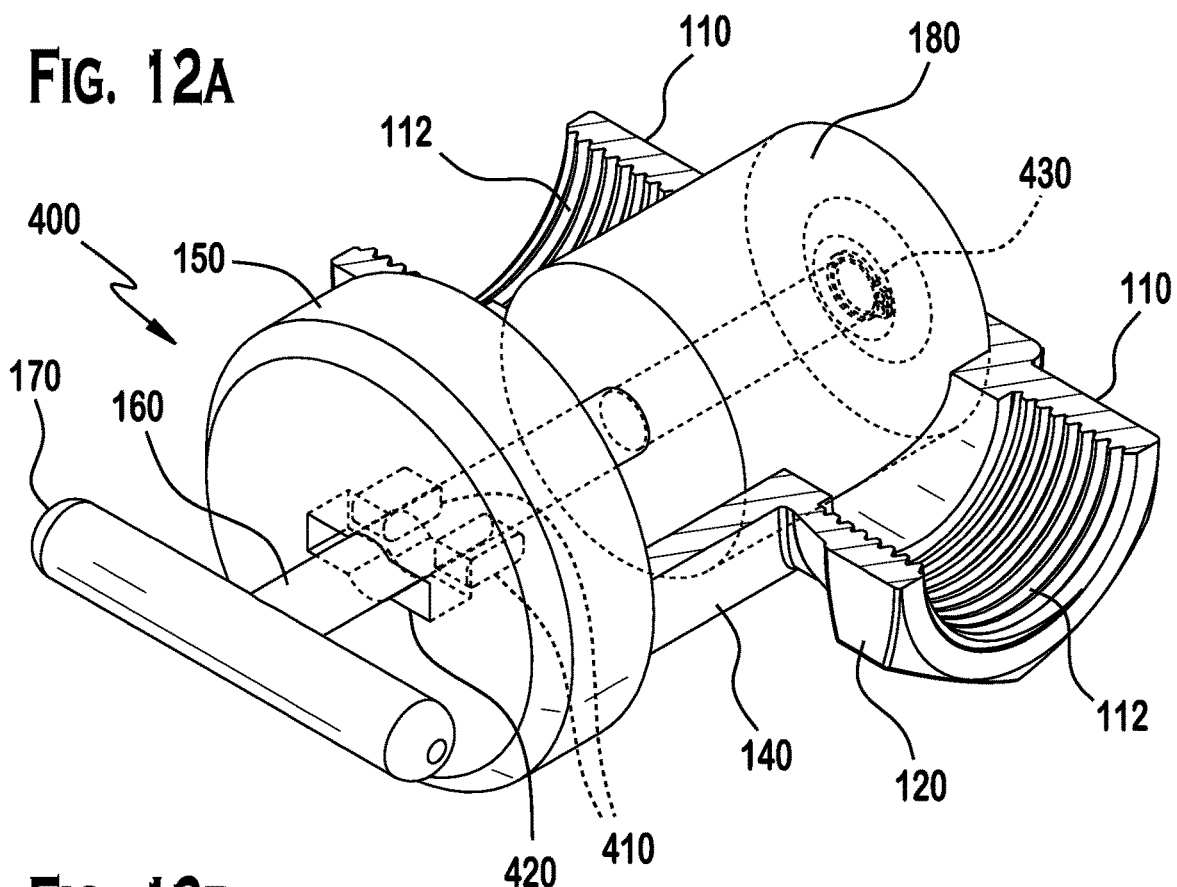
Figure 12C:
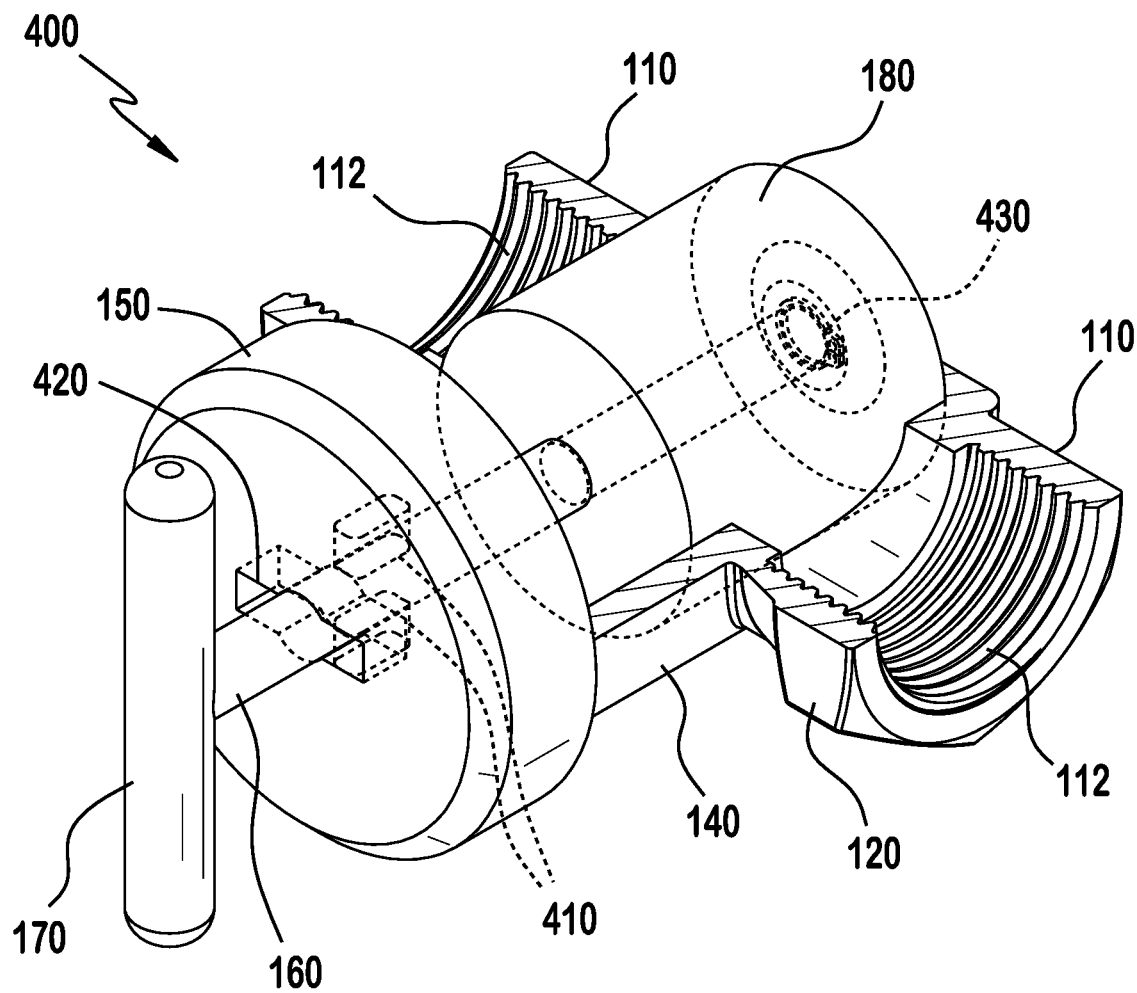

FIGS. 12A-C illustrate perspective views of an example valve 400 capable of being locked in the closed configuration. The perspective views have a top portion of the shaft 140 and pipe 110 removed so the stopper 180 is visible therewithin. The shaft 160 includes tabs 410 extending therefrom and the cover 150 includes associated slots 420 extending from the opening therein. In an open configuration (as illustrated in FIG. 12A), the tabs 410 are located external to the cover 150. In a closed configuration (as illustrated in FIG. 12B), the tabs 410 are slid through the corresponding slots 420 and are located internal to the cover 150. In a locked configuration (as illustrated in FIG. 12C), the tabs 410 are rotated so that they are not aligned with the corresponding slots 420. In the locked configuration, the stem 160 and the handle 170 cannot be pulled out (also the stopper 180 cannot inadvertently slide outward so as to not completely block the pipe 110).

According to one embodiment, the stem 160 may pass all the way through the stopper 180 and be secured on the far end of the stopper 180 with a clip 430. The clip 430 may be such that it enables the stem 160 to rotate therein. This type of configuration would enable the turning of the handle 170 and stem 160 to lock (or unlock) the valve 400 without the stopper 180 rotating. That is, the stem 160 would be able to rotate within the stopper 180. This embodiment would likely require that the stem 160 and the stopper 180 not be threaded. It should be noted that this connection configuration between the stem 160 and stopper 180 could be implemented in any of the other embodiments described and illustrated herein.

Figure 13:
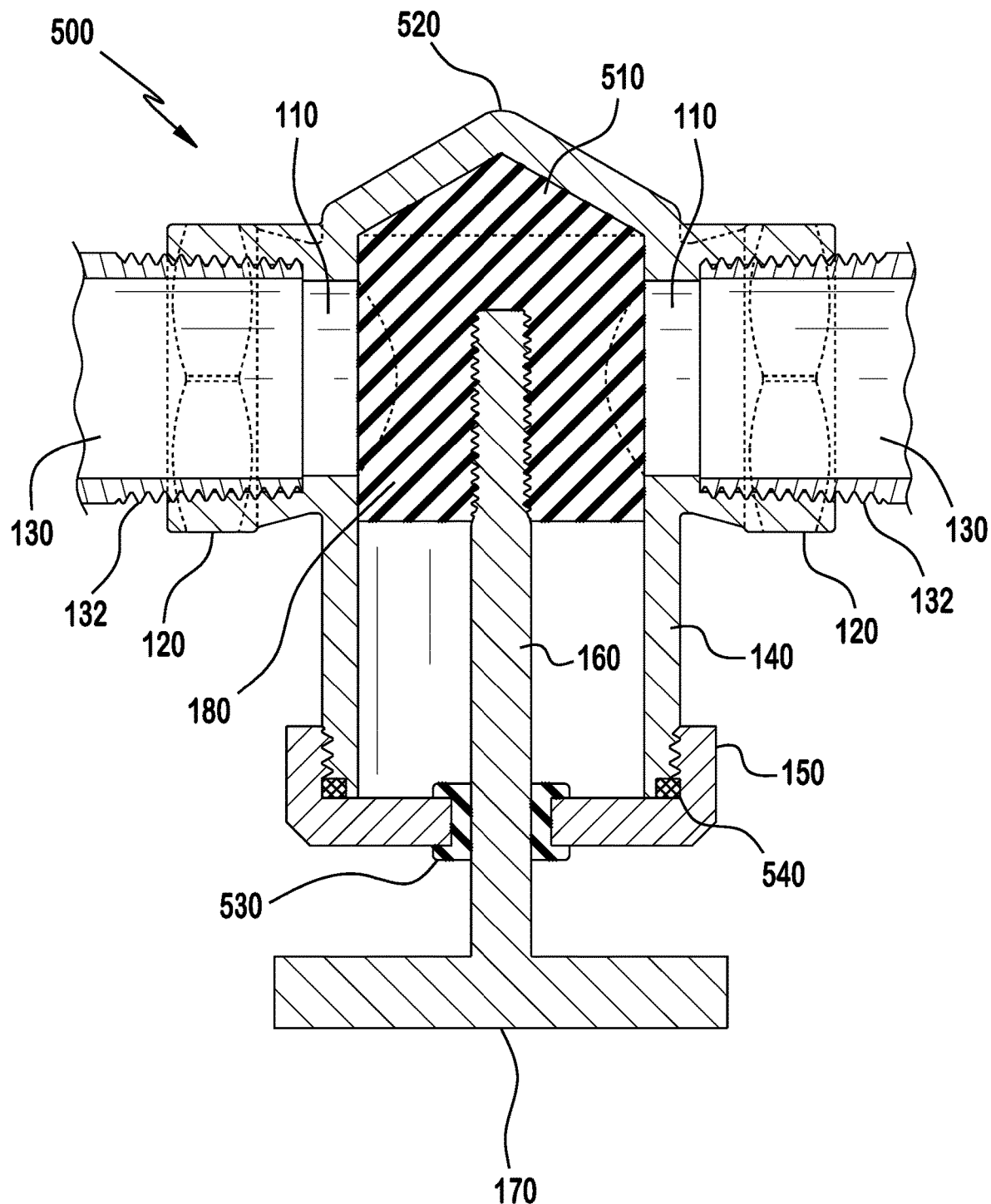
FIG. 13 illustrates a side-to-side cross-sectional view of an alternative embodiment of a valve including a tapered stopper, according to one embodiment.

FIG. 13 illustrates a side-to-side cross-sectional view (similar to FIGS. 3A-B) of an alternative embodiment of a valve 500. The valve 500 includes a stopper 180 having a leading end 510 that is tapered in order to reduce the pressure on the flow of water through the pipe 110 when closing the valve. As the stopper 510 includes a tapered end 510, a first end 520 of the shaft 140 is also tapered so that the two can abut one another in a closed configuration. The stopper could be made of a compressible material (e.g., rubber) or could be made of a rigid material and have compressible material secured therearound (such as described with respect to FIGS. 7-9).

The valve 500 also illustrates a rubber (or other compressible material) washer, O-ring, grommet or the like 530 to provide for sealing around the hole in the cover 150. The washer 530 is illustrated as being located within the hole and extending onto an upper and lower surface of the cover 150 (e.g., H-shaped O-ring) but is not limited thereto. The valve 500 also illustrates a rubber (or other compressible material) washer, O-ring, grommet or the like 540 around the diameter of the cover 150 to provide for sealing between the cover 150 and the shaft 140. It should be noted that these seals 530, 540 could be implemented in any of the other embodiments described and illustrated herein.

The stem 160 is illustrated as simply being secured to the stopper 180 and extending through the cover 150 (in similar fashion to the valve 100 described and illustrated in FIGS. 1-6). The stem 160 is in no way limited thereto. For example, the stem 160 could include a pivot point that enabled it to be folded such as described and illustrated in FIGS. 10-11 or could include tabs 410 to engage with corresponding slots 420 in the cover 150 to provide a locking mechanism such as described in FIGS. 12A-C.

Figure 14:
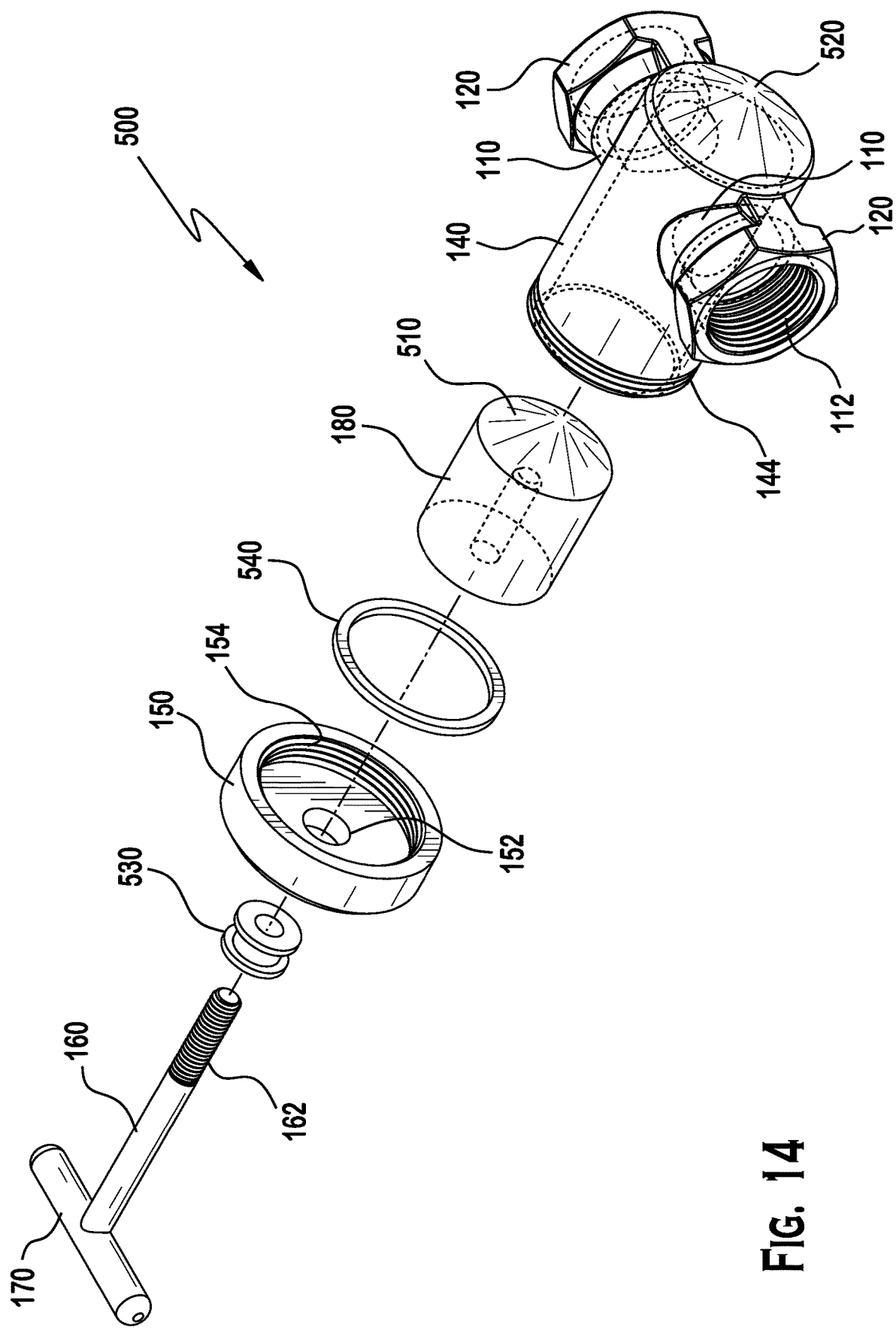
FIG. 14 illustrates an exploded view of the example valve of FIG. 13, according to one embodiment.

FIG. 14 illustrates an exploded view of the example valve 500. The first end 520 of the shaft 140 that extends slightly past the first side of the pipe 110 is tapered. The leading end 510 of the stopper 180 is also tapered. The seals 530, 540 are shown as individual items. The threads 154 in an inner diameter of the cover 150 engage with the threads 144 in an outer diameter 144 of the shaft 140.

Figure 15:
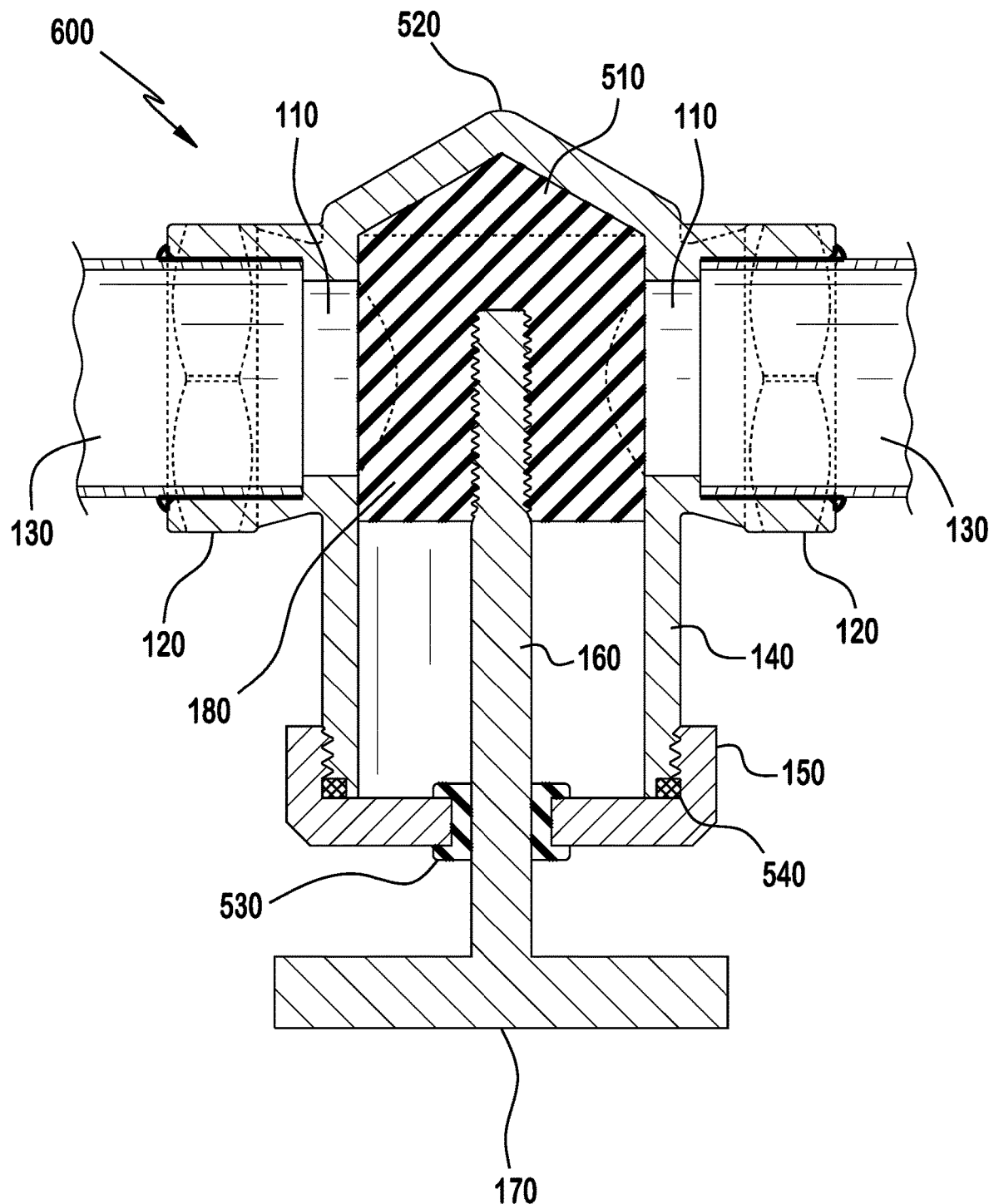
FIG. 15 illustrates a side-to-side cross-sectional view of a valve similar to the valve of FIG. 13 where the water pipes are soldered thereto, according to one embodiment.

FIG. 15 illustrates a side-to-side cross-sectional view of the valve 600 (similar to the valve 500) where the water pipes 130 and the passthrough pipe 110 are not threaded as illustrated in the other embodiments described and illustrated herein. Rather, the water pipes 130 and the passthrough pipe 110 are secured to one another via sweating (soldered together). This type of connection between the water pipes 130 and the valve 500 could be implemented in any of the other embodiments described and illustrated herein. It should be noted that even though the pipes 110, 130 are illustrated as being sweated together instead of threaded, the pipe 110 may still include a hex end 120 to enable a wrench to be used to help secure the pipes 110, 130 together. However, the hex end 130 is not required.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A water valve comprising:
   a shut-off shaft having an open interior with a first diameter, a closed first end and an open second end;
   a passthrough pipe perpendicular to the shut-off shaft, wherein the passthrough pipe has an open interior with a second diameter and includes an inlet to receive a first water pipe and an outlet to receive a second water pipe, wherein the first water pipe provides water to the passthrough pipe and the second water pipe receives water from the passthrough pipe, wherein the second diameter of the passthrough pipe is smaller than the first diameter of the shut-off shaft, wherein the passthrough pipe traverses through the shut-off shaft near the closed first end thereof, and wherein the open second end of the shut-off shaft extends greater than the second diameter from the passthrough pipe;
   a stopper having a diameter substantially same as the first diameter and a length greater than the second diameter, wherein the stopper is located within the shut-off shaft and is capable of traversing therewithin from an open position where the stopper is located external to a portion of the shut-off shaft that the passthrough pipe traverses through and accordingly does not affect flow of water therethrough to a closed position where the stopper is located within the portion of the shut-off shaft that the passthrough pipe traverses through and accordingly blocks the flow of water therethrough;
   a cover secured to the open second end of the shut-off shaft, wherein the cover has a hole therein; and
   a stem connected to the stopper and extending through the hole in the cover, wherein the stem includes a handle external to the shut-off shaft to enable a user to push or pull the stopper between the open and the closed configurations as desired.

2. The water valve of claim 1, wherein
   the handle is pushed inward to push the stopper into the portion of the shut-off shaft that the passthrough pipe traverses through to close the valve and prevent the water from flowing therethrough; and
   the handle is pulled outward to pull the stopper out of the portion of the shut-off shaft that the passthrough pipe traverses through to open the valve and allow the water to flow therethrough.

3. The water valve of claim 1, wherein the stopper is made of a compressible material.

4. The water valve of claim 1, wherein the stopper is made of a rigid material and includes one or more compressible rings therearound to provide sealing.

5. The valve of claim 1, wherein the cover is threaded onto the open second end of the shut-off shaft.

6. The valve of claim 1, further comprising a first seal within the hole of the cover and second seal between the cover and the open second end of the shut-off shaft.

7. The valve of claim 1, wherein the inlet and the outlet of the passthrough pipe are threaded so that the first and the second water pipes can be threadedly secured thereto.

8. The valve of claim 1, wherein an exterior of the inlet and the outlet of the passthrough pipe are hex shaped to enable a wrench to be used to secure the first and the second water pipes thereto.

9. The valve of claim 1, wherein the stopper includes at least one pathway passing lengthwise therethrough to enable water within the passthrough pipe to pass therethrough and relieve pressure when entering the closed configuration.

10. The valve of claim 1, wherein the closed first end of the shut-off shaft is tapered away from the passthrough pipe and a leading edge of the stopper is likewise tapered so that the stopper and the shut-off shaft abut one another in the closed configuration, and wherein the taper of the stopper reduces pressure when entering the closed configuration.

11. The valve of claim 1, wherein the stem is capable of pivoting from parallel to the shut-off shaft to perpendicular to the shut-off shaft so the handle does not extend to far past the shut-off shaft.

12. The valve of claim 1, wherein the stem includes tabs extending therefrom and the cover includes corresponding slots extending from the hole in the cover, wherein the tabs can pass through the slots to enter the open or the closed configurations, and wherein the stem can be turned so that tabs do not align with the slots to secure the stopper in the closed configuration.

13. The valve of claim 12, wherein the stem and the stopper are secured so that rotation of the stem does not cause rotation of the stopper.

14. A water valve comprising:
- a first shaft having an open interior with a first diameter, the first shaft having a closed first end and an open second end;
- a second shaft having an open interior with a second diameter smaller than the first diameter, wherein the second shaft perpendicularly passes through a first portion of the first shaft, wherein a first end of the second shaft is to receive a first water pipe providing water thereto and a second end of the second shaft is to receive a second water pipe receiving water therefrom, wherein a second portion of the first shaft is between the first portion and the closed first end, wherein a third portion of the first shaft is between the first portion and the open second end, and wherein the third portion has a length greater than the second diameter;
- a stopper having a third diameter substantially same as the first diameter and a length greater than the second diameter, wherein the stopper is located within the first shaft and is capable of traversing therewithin from an open position where the stopper is located in the third portion and accordingly does not affect flow of water through the second shaft to a closed position where the stopper is located within the first and second portions and accordingly blocks the flow of water through the second shaft;
- a cover secured to the open second end of the first shaft and having a centrally located hole therein;
- a stem connected to the stopper and extending through the hole in the cover; and
- a handle connected to the stem to enable a user to push or pull the stopper between the open and the closed configurations as desired.

15. The valve of claim 14, wherein an exterior of the first and the second ends of the second shaft are hex shaped to enable a wrench to be used to secure the first and the second water pipes thereto.

16. The valve of claim 14, wherein the stopper includes at least one pathway passing lengthwise therethrough to enable water within the second shaft to pass therethrough and relieve pressure when entering the closed configuration.

17. The valve of claim 14, wherein the closed first end of the first shaft is tapered away from the second shaft and a leading edge of the stopper is likewise tapered, wherein the taper of the stopper provides easier movement of the stopper through the water when entering the closed configuration, and wherein the stopper and the closed first end abut one another in the closed configuration.

18. The valve of claim 14, wherein the stem includes tabs extending therefrom and the cover includes corresponding slots extending from the hole therein, wherein the tabs can pass through the slots to move the stopper, wherein the stem can be turned so that tabs do not align with the slots to secure the stopper in the closed configuration, and wherein the stem and the stopper are secured so that rotation of the stem does not cause rotation of the stopper.

19. A water valve comprising:
- a first shaft having an open interior with a first diameter, the first shaft having a tapered closed first end and an open second end;
- a second shaft having an open interior with a second diameter smaller than the first diameter, wherein a first end of the second shaft is to receive a first water pipe providing water thereto and a second end of the second shaft is to receive a second water pipe receiving water therefrom, wherein the second shaft perpendicularly passes through a first portion of the first shaft, wherein a second portion of the first shaft is between a first side of the second shaft and the tapered closed first end, wherein a third portion of the first shaft is between a second side of the second shaft and the open second end, and wherein the third portion has a length greater than the second diameter;
- a stopper having a third diameter substantially same as the first diameter and a length greater than the second diameter, wherein a leading end of the stopper is tapered in substantially same manner as tapered closed first end of the first shaft, wherein the stopper is located within the first shaft and is capable of traversing therewithin from an open position where the stopper is only located in the third portion and accordingly does not affect flow of water through the second shaft to a closed position where the stopper is located within the first and second portions and accordingly blocks the flow of water through the second shaft;
- a cover secured to the open second end of the first shaft and having a centrally located hole therein;
- a stem connected to the stopper and extending through the hole in the cover; and
- a handle connected to the stem to enable a user to push or pull the stopper between the open and the closed configurations as desired.

20. The valve of claim 19, wherein an exterior of the first and the second ends of the second shaft are hex shaped to enable a wrench to be used to secure the first and the second water pipes thereto.

* * * * *